United States Patent
Naito (10) Patent No.: US 11,361,180 B2
(45) Date of Patent: Jun. 14, 2022

(54) SYMBOL READING DEVICE AND METHOD

(71) Applicant: TOSHIBA TEC KABUSHIKI KAISHA, Tokyo (JP)

(72) Inventor: Hidehiro Naito, Mishima Shizuoka (JP)

(73) Assignee: TOSHIBA TEC KABUSHIKI KAISHA, Tokyo (JP)

( * ) Notice: Subject to any disclaimer, the term of this patent is extended or adjusted under 35 U.S.C. 154(b) by 213 days.

(21) Appl. No.: 16/291,502

(22) Filed: Mar. 4, 2019

(65) Prior Publication Data

US 2019/0272404 A1 Sep. 5, 2019

(30) Foreign Application Priority Data

Mar. 5, 2018 (JP) .............................. JP2018-038172

(51) Int. Cl.
*G06K 7/14* (2006.01)
*G06Q 20/20* (2012.01)
*G07G 1/00* (2006.01)

(52) U.S. Cl.
CPC ......... *G06K 7/1413* (2013.01); *G06Q 20/202* (2013.01); *G06Q 20/208* (2013.01); *G07G 1/0045* (2013.01)

(58) Field of Classification Search
CPC .. G06K 7/1413; G06Q 20/202; G06Q 20/208; G07G 1/0045
USPC .......................................................... 705/21
See application file for complete search history.

(56) References Cited

U.S. PATENT DOCUMENTS

| | | | |
|---|---|---|---|
| 5,179,269 A | 1/1993 | Horie et al. | |
| 5,280,162 A | 1/1994 | Marwin | |
| 5,630,071 A | 5/1997 | Sakai et al. | |
| 6,527,179 B1 * | 3/2003 | Itoh .................. | G06K 7/1465 235/462.01 |
| 7,010,501 B1 * | 3/2006 | Roslak ............... | G06Q 20/20 705/23 |

(Continued)

FOREIGN PATENT DOCUMENTS

| | | |
|---|---|---|
| EP | 0548451 A2 | 6/1993 |
| EP | 0997858 A2 | 5/2000 |

(Continued)

OTHER PUBLICATIONS

Extended European Search Report dated Jun. 3, 2019, mailed in counterpart European Application No. 19160508.8, 7 pages.

(Continued)

*Primary Examiner* — Florian M Zeender
*Assistant Examiner* — Nicole Elena Bruner
(74) *Attorney, Agent, or Firm* — Kim & Stewart LLP (57) ABSTRACT

A symbol reading device includes a reading unit to read a code symbol attached to a commodity and a control unit. The control unit is configured to determine whether start button or the like for the reading unit has been pressed, allow the reading unit to read a first symbol within a first predetermined time after pressing of the button, and allow the reading unit to read a second symbol within a second predetermined time if the reading unit reads the first symbol.

(Continued)

Registration processing is executed based on the first symbol and the second symbol when read. Symbol reading is ended when either the reading unit does not read the first symbol within the first predetermined time or the reading unit does not read the second symbol within second predetermined time.

20 Claims, 7 Drawing Sheets

(56) References Cited

U.S. PATENT DOCUMENTS

| | | | | |
|---|---|---|---|---|
| 8,006,904 | B2* | 8/2011 | Salim | G07G 1/009 |
| | | | | 235/487 |
| 8,517,266 | B2* | 8/2013 | Yamada | A47F 9/047 |
| | | | | 235/383 |
| 2004/0249717 | A1 | 12/2004 | Shirasaki | |
| 2008/0073435 | A1* | 3/2008 | Jiang | G06K 7/10861 |
| | | | | 235/462.25 |
| 2008/0243626 | A1* | 10/2008 | Stawar | G06Q 30/02 |
| | | | | 705/23 |
| 2011/0180596 | A1 | 7/2011 | Iizaka et al. | |
| 2013/0026236 | A1 | 1/2013 | Goren | |
| 2015/0025990 | A1* | 1/2015 | Suzuki | G06Q 20/204 |
| | | | | 705/20 |

FOREIGN PATENT DOCUMENTS

| | | |
|---|---|---|
| JP | H04134588 A | 5/1992 |
| JP | H05292261 A | 11/1993 |
| JP | H07152962 A | 6/1995 |
| JP | H10208152 A | 8/1998 |
| JP | 2001195537 A | 7/2001 |
| JP | 2013154648 A | 8/2013 |
| JP | 2015085556 A | 5/2015 |
| WO | 03054822 A1 | 7/2003 |

OTHER PUBLICATIONS

Japanese Office Action dated Jun. 22, 2021, mailed in counterpart Japanese Application No. 2018-038172, 6 pages (with translation).
European Office Action dated Mar. 23, 2021, mailed in counterpart European Application No. 19160508.8, 11 pages.
Japanese Office Action dated Nov. 24, 2021, mailed in counterpart Japanese Application No. 2018-038172, 6 pages (with translation).

* cited by examiner

SYMBOL READING DEVICE AND METHOD

CROSS-REFERENCE TO RELATED APPLICATION

This application is based upon and claims the benefit of priority from Japanese Patent Application No. 2018-038172, filed in Mar. 5, 2018, the entire contents of which are incorporated herein by reference.

FIELD

Embodiments described herein relate generally to a symbol reading device and a method.

BACKGROUND

In the related art, when shopping at a store such as supermarkets and shopping centers, customers use shopping carts that may move within the store and put commodities in the cart to purchase. A customer moves the shopping cart about the store and puts commodities to be later purchased into the shopping cart or a basket of the shopping cart. When the shopping is over, the customer moves the shopping cart to a checkout section including a point of sale (POS) terminal or the like and performs settlement processing for the commodities in the shopping cart.

Recently, a shopping cart having a symbol reading device for reading a bar code or the like on a commodity has been introduced. With such a shopping cart, the customer press a start button to allow the symbol reading device to read a code symbol of a commodity being put in the shopping cart. Once the start button is pressed, the symbol reading device may attempt to read a code symbol for only some predetermined time. Thus, the customer must read the code symbol using the symbol reading device within this predetermined time before putting the commodity into the shopping cart. The shopping cart can then store the commodity information of each commodity that has been read by the symbol reading device. By operating in this manner, it may be unnecessary for the commodities being purchased by the customer to be scanned/read again at the commodity checkout section for purposes of settlement processing.

However, in this related art, as soon as the symbol reading device attached to the shopping cart reads a code symbol of one commodity, the symbol reading device is not ready to read again until the start button is pressed again. Thus, the customer must press the start button again in order to read the code symbol of the next commodity to be placed in the shopping cart. Therefore, when code symbols of several commodities are to be read consecutively, it is necessary to press the start button for every commodity, which is troublesome for the customer.

DETAILED DESCRIPTION

According to one embodiment, a symbol reading device comprises control unit and a reading unit configured to read a symbol attached to a commodity for identifying the commodity. The control unit is configured to: determine whether an operation button for starting a symbol reading of the reading unit has been pressed; allow the reading unit to read a first symbol within a first predetermined time after it is determined that the operation button has been pressed; allow the reading unit to read a second symbol within a second predetermined time if the reading unit reads the first symbol within the first predetermined time; execute registration processing for commodities based on the first symbol read within the first predetermined time and the second symbol read within second predetermined time; and end the symbol reading of the reading unit when either the reading unit does not read the first symbol within the first predetermined time or the reading unit does not read the second symbol within second predetermined time.

Hereinafter, a first embodiment will be described with reference to FIGS. 1 to 6. A second embodiment will be described with reference to FIGS. 7 and 8. In the first embodiment and the second embodiment, a cart terminal will be described as an example of a symbol reading device. The present disclosure is not limited to the first embodiment and the second embodiment described below.

First Embodiment

Figure 1:
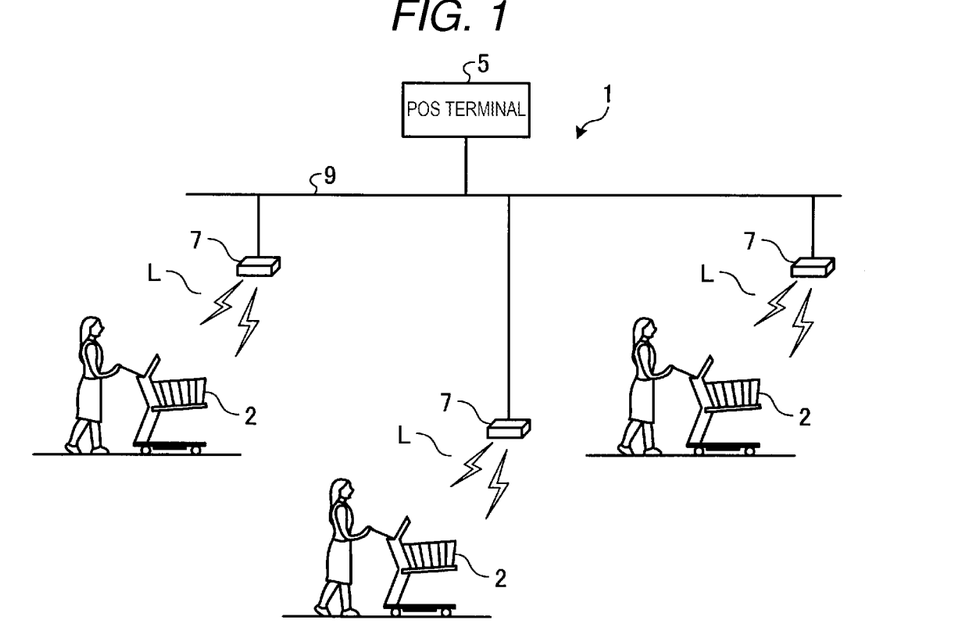
FIG. 1 is a schematic diagram showing a checkout system according to a first embodiment.

FIG. 1 is a system configuration diagram schematically showing an overall configuration of a checkout system according to a first embodiment. As shown in FIG. 1, in a checkout system 1, a plurality of shopping carts 2 and a point of sales (POS) terminal 5 for performing settlement processing for commodities purchased by customers are connected via a network 9 such as a local area network (LAN). A cart terminal 4 is attached to the shopping cart 2. The cart terminal 4 is connected to the network 9 by a wireless communication link L to a wireless communication unit 7 having an antenna and installed on a ceiling of a store or the like. The cart terminal 4 is capable of communicating with the POS terminal 5 in a wirelessly. The cart terminal 4 is mounted in a direction to display information to a customer who pushes a cart. The information to be displayed to the customer can be, for example, commodity information (commodity name, price, and the like) of a commodity to be purchased. In addition, the information to be displayed to the customer can be, for example, sales promotion information from the store.

In the store where such checkout system 1 is provided, the customer obtains the shopping cart 2 at an entrance of the store. Then, the customer pushes the shopping cart 2 around the store, takes a commodity to be purchased from a commodity shelf or the like and puts the selected commodity in the shopping cart 2. Code symbols in the form of, for example, a bar code or other two-dimensional code are attached to, or otherwise included with, individual commodities. The customer reads the code symbol attached to the commodity by using a symbol reading unit 49 (see FIG. 2) of the cart terminal 4 attached to the shopping cart 2. The customer then puts the commodity whose code symbol has been read into the shopping cart 2. When the customer finishes reading the code symbols of the commodities to be purchased, the customer moves the shopping cart 2 to the POS terminal 5 and performs settlement processing. After the settlement processing, the customer removes and packs the commodities from the shopping cart 2, returns the shopping cart 2, and leaves the shop through an exit.

The shopping cart 2 is connected to the POS terminal 5 and a store server (not shown) via the communication link L and receives information from a commodity master table or list storing commodity information (commodity name, price, and the like) of commodities being sold at the store from the POS terminal 5 or otherwise the store server. In addition, the shopping cart 2 is connected to the POS terminal 5 via the communication link L, and transmits, for example, commodity information for each commodity whose code symbol has been read at the cart terminal 4 to the POS terminal 5.

Figure 2:
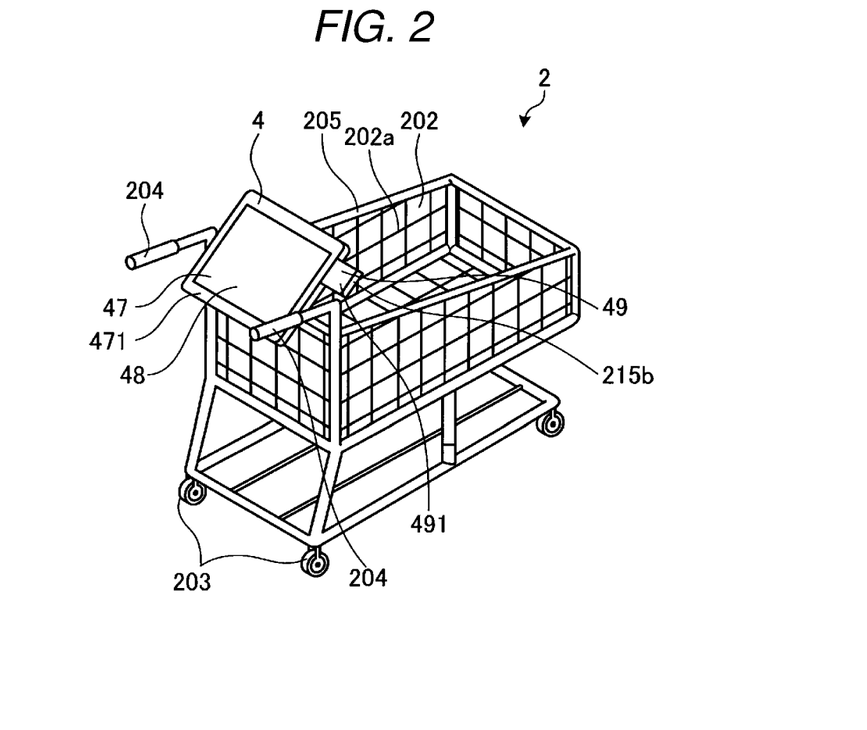
FIG. 2 is a perspective view showing a configuration of a shopping cart.

FIG. 2 is a perspective view showing the shopping cart 2. The shopping cart 2 includes a basket-shaped storage portion 202 having an opened top surface and a movable caster portion 203 disposed below the storage portion 202, and a handle portion 204, which is connected to the storage portion 202, for the customer grips when moving the shopping cart 2. In addition, the outer frame of the shopping cart 2 is formed by frames 205. In the storage portion 202, a mesh 202a is stretched between the frames 205 forming the storage portion 202, and the storage portion 202 stores commodities in a manner such that they may be seen from outside the shopping cart 2. As a result, the customer, a store clerk, and the like may easily visually confirm the commodities stored in the storage portion 202. The shopping cart 2 does not have to have a form in which the shopping cart 2 itself provides the storage portion 202. For example, the shopping cart 2 may incorporate a basket receiving portion for receiving a separable commodity basket that stores the commodities in a viewable manner from the outside, and the commodity basket received by the basket receiving portion may be the storage portion 202.

In addition, the cart terminal 4 is attached to a portion of the frames 205 forming the storage portion 202 on the side of the handle portion 204 via a holding portion (not specifically depicted). The cart terminal 4 includes a housing 471, and the housing 471 includes a display unit 47 consisting of a liquid crystal display (LCD), an operation panel 48 consisting of a touch panel mounted on the display surface of the display unit 47, and a symbol reading unit 49 that reads a code symbol. The symbol reading unit 49 includes a light emitting diode (LED) as a light source for illuminating a commodity, a charged coupled device (CCD) image sensor which receives the light reflected by the commodity, a decoder which decodes the light signal received by the image sensor and converts the light signal into a digital signal, and a reading window 491 for emitting the LED light and reading the code symbol The reading window 491 is provided on one surface of the symbol reading unit 49.

When putting a commodity in the shopping cart 2, the customer holds the attached symbol of the commodity to (or adjacent to) the reading window 491. Then, the symbol reading unit 49 reads the code symbol. In addition, the symbol reading unit 49 decodes the code symbol that has been read. The cart terminal 4 acquires a commodity code identifying the commodity via the symbol reading unit 49. The cart terminal 4 may transmit the decoded digital signal to the POS terminal 5 and acquire the commodity code from the POS terminal 5.

Figure 3:
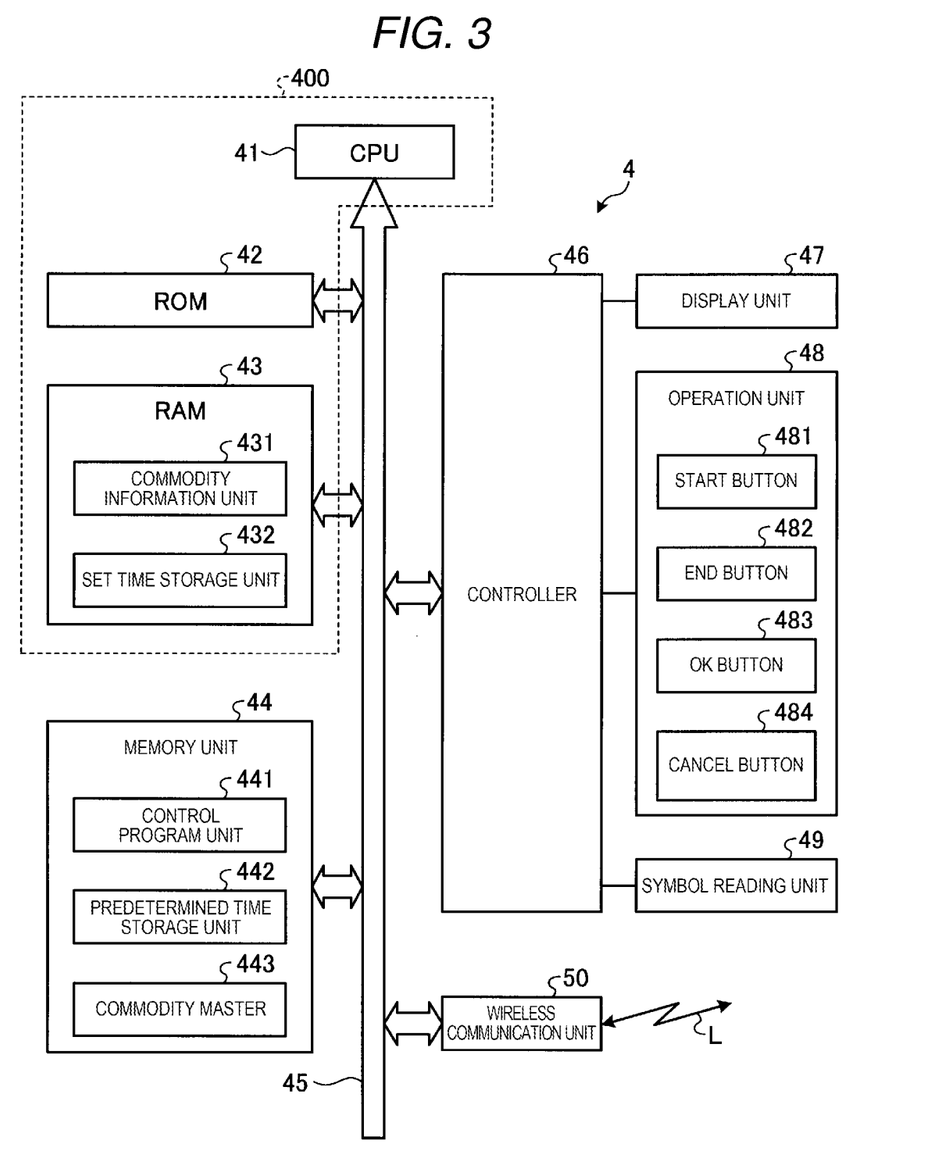
FIG. 3 is a block diagram showing a hardware configuration of a cart terminal.

FIG. 3 is a block diagram showing a hardware configuration of the cart terminal 4. As shown in FIG. 3, the cart terminal 4 includes a central processing unit (CPU) 41, a read only memory (ROM) 42, a random-access memory (RAM) 43, a memory unit 44, and the like. The CPU 41 is a main controller. The ROM 42 stores various programs. The RAM 43 stores portions of the programs and various pieces of data during operations of the CPU 41. The memory unit 44 stores various programs. The CPU 41, the ROM 42, the RAM 43, and the memory unit 44 are connected to each other via a bus 45. The CPU 41, the ROM 42, and the RAM 43 collectively constitute a control unit 400, also referred to as a controller. The control unit 400 executes control processing related to the cart terminal 4 by operations of the CPU 41 in accordance with the control program stored in the ROM 42 or the memory unit 44 and loaded in the RAM 43.

The RAM 43 includes a commodity information unit 431 and a set time storage unit 432. The commodity information unit 431 stores the commodity information of the commodity for which the symbol reading unit 49 has read the code symbol. The set time storage unit 432 sets a time from after the start button 481 is pressed and the LED is turned on until the LED is turned off. That is, the set time is the time during which the symbol reading unit 49 may read code symbols.

The memory unit 44 comprises a nonvolatile memory such as a hard disk drive (HDD) or a flash memory that holds stored information even when the power is turned off. The memory unit 44 includes a control program unit 441, a predetermined time storage unit 442, and a commodity master 443. The control program unit 441 stores a control program for controlling the cart terminal 4. The predetermined time storage unit 442 stores the time from when the LED is turned on to when the LED is turned off. The predetermined time storage unit 442 stores the time for setting in the set time storage unit 432. The predetermined time storage unit 442 stores a first predetermined time and a second predetermined time as the time for setting in the set time storage unit 432. The first predetermined time is, for example, 20 seconds. The second predetermined time is shorter than the first predetermined time, for example, 5 seconds. The commodity master 443 stores commodity information such as the commodity name and price of a commodity in association with a commodity code for substantially all commodities to be sold at the store. The commodity master 443 receives information from a commodity master 542 from the POS terminal 5 and, generally, has the same content categories as the commodity master 542.

The control unit 400 is connected to the display unit 47, the operation panel 48, and the symbol reading unit 49 via the bus 45 and a controller 46. Under the control of the control unit 400, the display unit 47 displays an image of a start button, an image of an end button, an image of an OK button, and an image of a cancel button. In addition, the display unit 47 displays commodity information (commodity name, price, and the like) of the commodity read by the symbol reading unit 49. In addition, when an end button 482 is operated/pressed, the display unit 47 displays the total sales amount, the tax amount, and the like of the commodities read by the symbol reading unit 49 (that is, the commodities being purchased by the customer).

The operation panel 48 has an operation button at a position corresponding to the image of the start button displayed by the display unit 47. The start button 481 is a button that serves as a trigger to turn on the LED of the symbol reading unit 49. When the start button 481 is operated, the control unit 400 turns on the LED. When the LED is turned on, the symbol reading unit 49 may read the code symbol. In addition, the operation panel 48 includes an end button 482 at a position corresponding to the image of the end button displayed by the display unit 47. The end button 482 is a button to be operated when the customer decides the purchasing has ended. In addition, the operation panel 48 includes an OK button 483 at a position corresponding to the image of the OK button to be displayed by the display unit 47. The OK button 483 is a button to be operated by the customer when there is no problem with the sales total amount or the like displayed by the display unit 47. In addition, the operation panel 48 includes a cancel button 484 at a position corresponding to the image of the cancel button to be displayed by the display unit 47. The cancel button 484 is a button to be operated by the customer when there is a problem with the sales total amount or the like displayed by the display unit 47 or when the purchase of the commodity is canceled.

In addition, the control unit 400 is connected to a wireless communication unit 50 via the bus 45. The wireless communication unit 50 is communicably connected to the POS terminal 5 via the communication link L, the wireless communication unit 7, and the network 9.

The cart terminal 4 executes sales registration processing of the commodities for which the symbol reading unit 49 has read the symbol. The sales registration processing executed by the cart terminal 4 displays the commodity information read from the commodity master 443.

Figure 4:
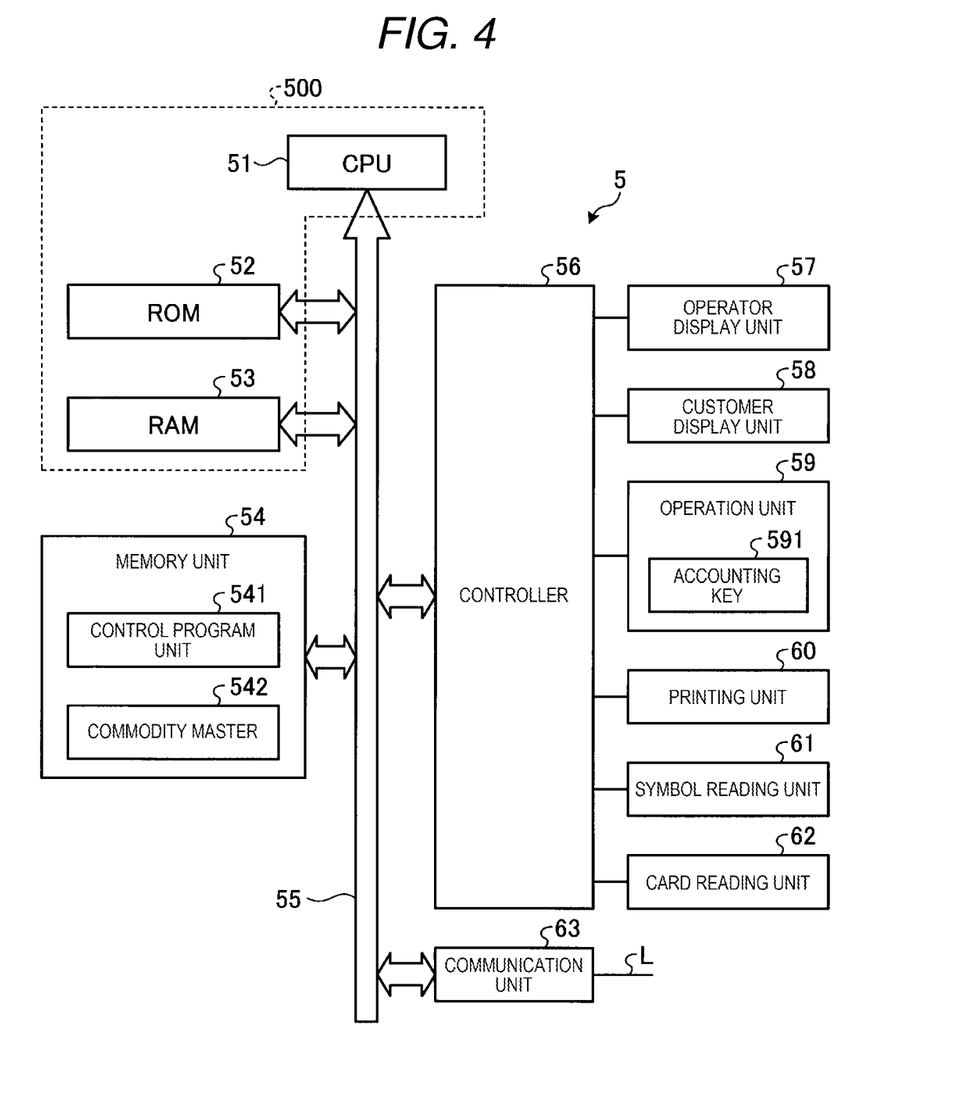
FIG. 4 is a block diagram showing a hardware configuration of a POS terminal.

The POS terminal 5 executes sales registration processing for code symbols read by a symbol reading unit 61 included in the POS terminal 5. The sales registration processing displays and stores the commodity information (commodity name, price, and the like) read from the commodity master 542 based on the acquired commodity codes.

In addition, the POS terminal 5 performs settlement processing on the commodities whose sales registration processing was performed at the cart terminal 4 (or the POS terminal 5). Settlement processing includes displaying the sales total amount for the sales transaction, calculating and displaying the change due amount based on the amount of money received from the customer, and the like, based on the commodity information from the sales registration processing. In addition, the POS terminal 5 issues a receipt on which commodity information or settlement information is printed.

FIG. 4 is a block diagram showing a hardware configuration of the POS terminal 5. As shown in FIG. 4, the POS terminal 5 includes a CPU 51, a ROM 52, a RAM 53, a memory unit 54. The CPU 51 is a main controller. The ROM 52 stores various programs. The RAM 53 stores portions of programs and various pieces of data during operations. The memory unit 54 stores various programs. The CPU 51, the ROM 52, the RAM 53, and the memory unit 54 are connected to each other via a bus 55. The CPU 51, the ROM 52, and the RAM 53 constitute a control unit 500. That is, the control unit 500 executes control processing related to functions of the POS terminal 5 implemented by the CPU 51 operating in accordance with the control program stored in the ROM 52 or the memory unit 54 and loaded in the RAM 53.

The memory unit 54 consists of a nonvolatile memory such as an HDD or a flash memory that holds stored information even when the power is turned off. The memory unit 54 includes a control program unit 541 and the commodity master 542. The control program unit 541 stores a control program for controlling the POS terminal 5. The commodity master 542 stores commodity information such as the commodity name and price of a commodity in association with a commodity code for substantially all commodities to be sold at the store.

In addition, the control unit 500 includes an operator display unit 57, a customer display unit 58, an operation unit 59, a printing unit 60, a symbol reading unit 61, and a card reading unit 62 connected via the bus 55 and a controller 56. The operator display unit 57 displays information such as commodity information and accounting information to an operator, for example, a store clerk. The customer display unit 58 displays information such as commodity information and accounting information to the customer. The operation unit 59 is a keyboard or keypad including an accounting key 591 for ending a transaction with the customer. The printing unit 60 consists of, for example, a thermal printer and issues a receipt on which commodity information and accounting information related to a transaction are printed. The symbol reading unit 61 has a configuration similar to that of the symbol reading unit 49, and reads a code symbol at in the POS terminal 5. The card reading unit 62 reads credit cards and debit cards, for example. Based on the information from the card reading unit, the POS terminal 5 executes settlement processing by using a credit or debit card.

In addition, the control unit 500 is connected to a communication unit 63 via the bus 45. The communication unit 63 is communicably connected to the cart terminal 4 via the network 9, the wireless communication unit 7, and the communication link L.

Figure 5:
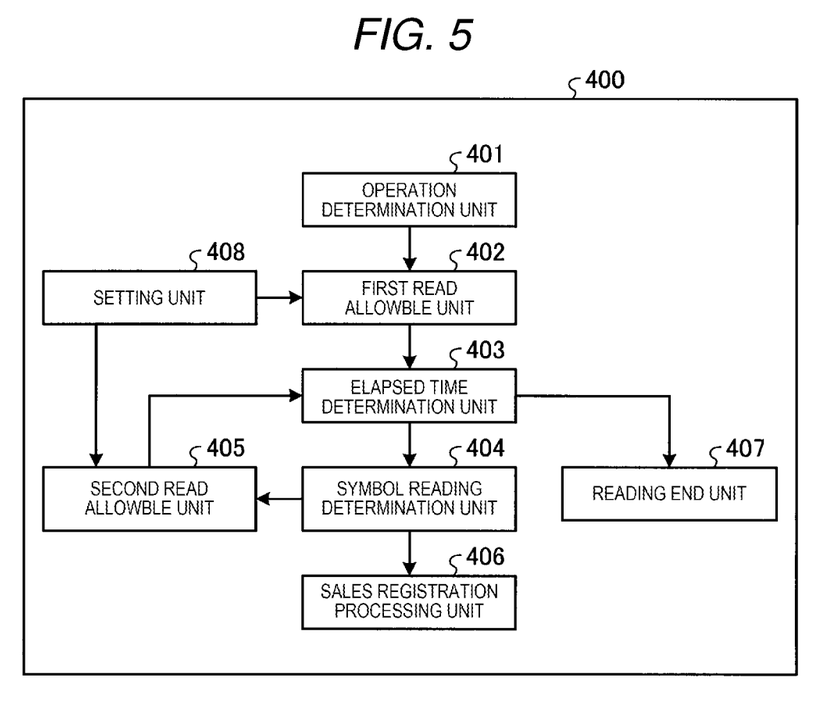
FIG. 5 is a schematic block diagram showing a functional configuration of a cart terminal.

The control unit 400 of the cart terminal 4 functions as an operation determination unit 401, a first read allowable unit 402, an elapsed time determination unit 403, a symbol reading determination unit 404, a second read allowable unit 405, a sales registration processing unit 406, a reading end unit 407, and a setting unit 408.

The operation determination unit 401 determines whether the start button 481 has been operated/pressed. When the operation determination unit 401 determines that the start button 481 has been operated, the first read allowable unit 402 operates to allow the symbol reading unit 49 to read a code symbol during the first predetermined time. The elapsed time determination unit 403 determines whether the first predetermined time has elapsed. The symbol reading determination unit 404 determines whether the symbol reading unit 49 has read a code symbol within the first predetermined time. When the symbol reading determination unit 404 determines that the symbol reading unit 49 has read the code symbol within the first predetermined time, the second read allowable unit 405 operates to allow the symbol reading unit 49 to read another code symbol during the second predetermined time. The elapsed time determination unit 403 determines whether the second predetermined time has elapsed. The symbol reading determination unit 404 determines whether the symbol reading unit 49 has read a code symbol within the second predetermined time.

When the symbol reading determination unit 404 determines that a code symbol was read within the first predetermined time or the second predetermined time, the sales registration processing unit 406 executes sales registration processing based on the read code symbol. When the elapsed time determination unit 403 determines that the first predetermined time or the second predetermined time elapsed, the reading end unit 407 ends the reading (or reading attempts) of the symbol reading unit 49. When the reading end unit 407 ends reading of the code symbols, it is not possible to read another code symbol with the symbol reading unit 49 until after the start button 481 is operated again.

Figure 6:
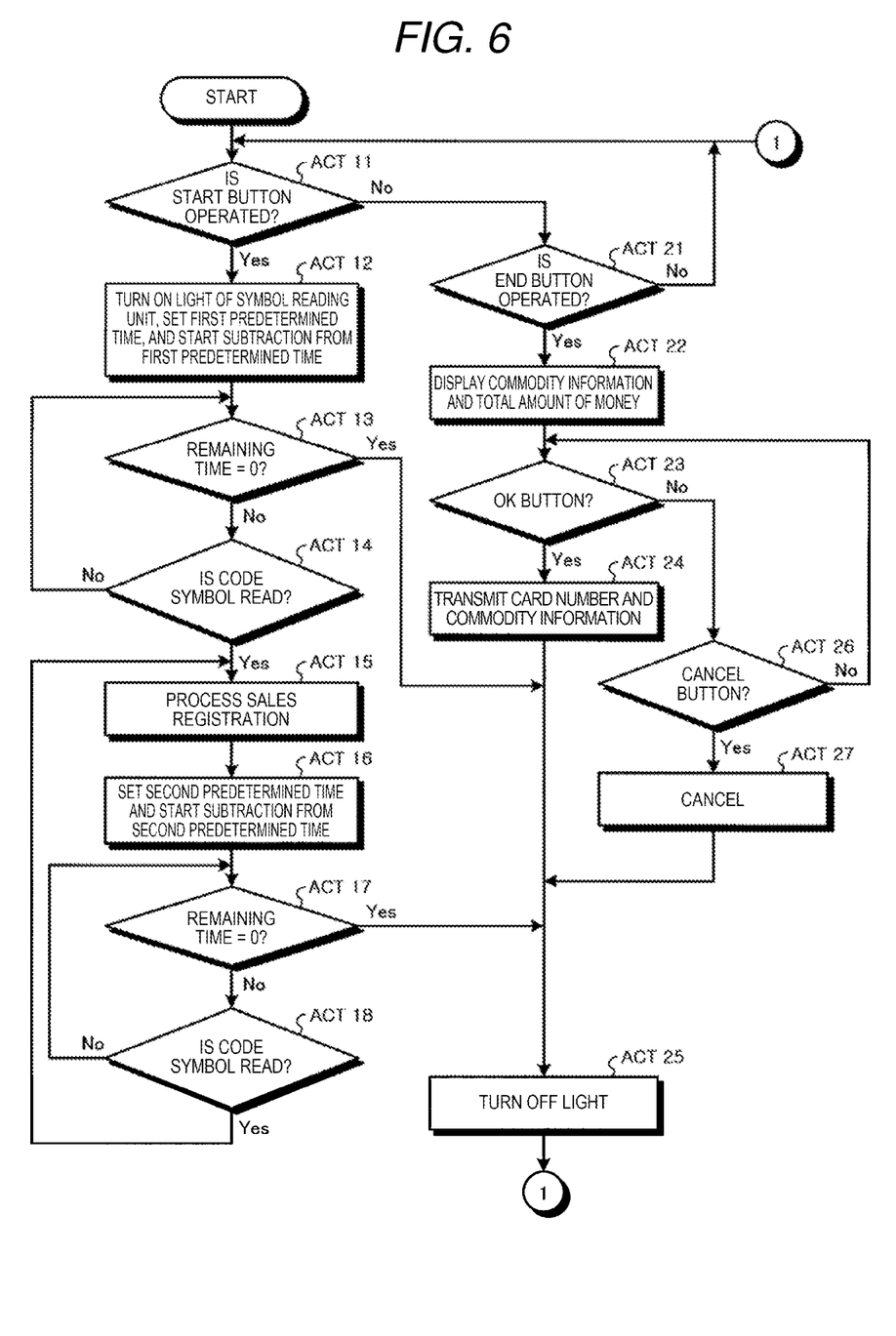
FIG. 6 is a flowchart depicting aspects of a control processing of a cart terminal.

FIG. 6 is a flowchart showing the flow of control processing of the cart terminal 4. As shown in FIG. 6, the operation determination unit 401 of the cart terminal 4 determines whether the start button 481 has been operated (Act 11). If the operation determination unit 401 determines that the start button 481 has been operated (Yes in Act 11), the first read allowable unit 402 turns on the LED of the symbol reading unit 49 (Act 12). When the LED is turned on, the symbol reading unit 49 may read a code symbol. In addition, the setting unit 408 reads the first predetermined time from the predetermined time storage unit 442 and sets (stores) the time in the set time storage unit 432 (Act 12). In addition, the first read allowable unit 402 starts time subtraction (counting down) from the set first predetermined time (Act 12). Here, the first read allowable unit 402 counts down from the first predetermined time, for example 20 seconds, in 1 second increments by using a counter or the like. In this way, the first read allowable unit 402 allows the symbol reading unit 49 to read a code symbol within the first predetermined time.

Next, the elapsed time determination unit 403 determines whether the first predetermined time has elapsed (Act 13). When the elapsed time determination unit 403 determines that the first predetermined time is not expired (No in Act 13), the symbol reading determination unit 404 determines whether the symbol reading unit 49 has read a code symbol (Act 14). When the symbol reading determination unit 404 determines that the code symbol has not been read (No in Act 14), the control unit 400 returns to Act 13. On the other hand, when the symbol reading determination unit 404 determines that a code symbol has been read (Yes in Act 14), the sales registration processing unit 406 executes sales registration processing of the commodity based on the commodity code obtained by analyzing the read code symbol (Act 15). The control unit 400 stores the commodity information for the registered commodity in the commodity information unit 431.

Next, the setting unit 408 reads the second predetermined time from the predetermined time storage unit 442 and sets (stores) the time in the set time storage unit 432 (Act 16). In addition, the second read allowable unit 405 starts time subtraction (counting down) from the set second predetermined time (Act 16). Since the LED of the symbol reading unit 49 is still turned on, the symbol reading unit 49 may read another code symbol within the second predetermined time.

Next, the elapsed time determination unit 403 determines whether the second predetermined time has been counted down to 0 (in other words, whether the second predetermined time has elapsed) (Act 17). When the elapsed time determination unit 403 determines that the second predetermined time is not expired (No in Act 17), the symbol reading determination unit 404 determines whether the symbol reading unit 49 has read a code symbol (Act 18). When the symbol reading determination unit 404 determines that a code symbol has not been read (No in Act 18), the control unit 400 returns to Act 17. On the other hand, when the symbol reading determination unit 404 determines that a code symbol has been read (Yes in Act 18), the control unit 400 returns to Act 15, and the sales registration processing unit 406 executes sales registration processing of the commodity based on the commodity code obtained by analyzing the read code symbol (Act 15). Thereafter, the processing in Act 15, Act 16, and Act 18 are repeated until Yes is determined in Act 17.

On the other hand, if the elapsed time determination unit 403 determines the first predetermined time has been counted down to 0 (that is, a code symbol has not been read during the first predetermined time) (Yes in Act 13), the reading end unit 407 turns off the LED of the symbol reading unit 49 (Act 25). In addition, if the elapsed time determination unit 403 also determines that the second predetermined time has been counted down to 0 (that is, the code symbol has not been read during the second predetermined time) (Yes in Act 17), the reading end unit 407 turns off the LED of the symbol reading unit 49 (Act 25). Once the LED of the symbol reading unit 49 is turned off, the symbol reading unit 49 may not read a code symbol. Then, the control unit 400 returns to Act 11.

In addition, in Act 11, if the operation determination unit 401 determines that the start button 481 has not been operated (No in Act 11), the control unit 400 determines whether the end button 482 has been operated (Act 21). Once the customer finishes purchasing commodities in the store, the customer moves to location of the POS terminal 5 and operates the end button 482 at some point. If it is determined that the end button 482 has been operated (Yes in Act 21), the control unit 400 displays the commodity information of the commodities registered for sales and the total sales amount on the display unit 47 (Act 22).

Next, the control unit 400 determines whether the OK button 483 has been operated (Act 23). If it is determined that the OK button 483 has been operated (Yes in Act 23), the control unit 400 transmits a card number identifying the shopping cart 2, the commodity information, the sales total amount, and the like displayed on the display unit 47, to the POS terminal 5 (Act 24). Then, the reading end unit 407 executes the processing of Act 25. In addition, the control unit 400 clears the information stored in the commodity information unit 431 and the set time storage unit 432. Then, the control unit 400 returns to Act 11.

In addition, if it is determined that the OK button 483 has not been operated (No in Act 23), the control unit 400 determines whether the cancel button 484 has been operated (Act 26). If it is determined that the cancel button 484 has been operated (Yes in Act 26), the control unit 400 cancels (clears) all the information stored in the commodity information unit 431 and the set time storage unit 432 (Act 27). Then, the control unit 400 executes the processing of Act 25. If it is determined that the cancel button 484 has not been operated (No in Act 26), the control unit 400 returns to Act 23. If it is determined that the end button 482 has not been operated (No in Act 21), the control unit 400 returns to Act 11.

According to the cart terminal 4 of the first embodiment, when the start button 481 is operated, the symbol reading unit 49 may read a code symbol for a fixed first predetermined time. Then, when the code symbol is read by the symbol reading unit 49 within the first predetermined time, it is possible to read another code symbol with the symbol reading unit 49 for a fixed second predetermined time. Then, when a code symbol is read within the first predetermined time or the second predetermined time, sales registration processing of the commodity identified by the code symbol is executed. Therefore, the symbols of a plurality of commodities may be read consecutively.

Second Embodiment

Figure 7:
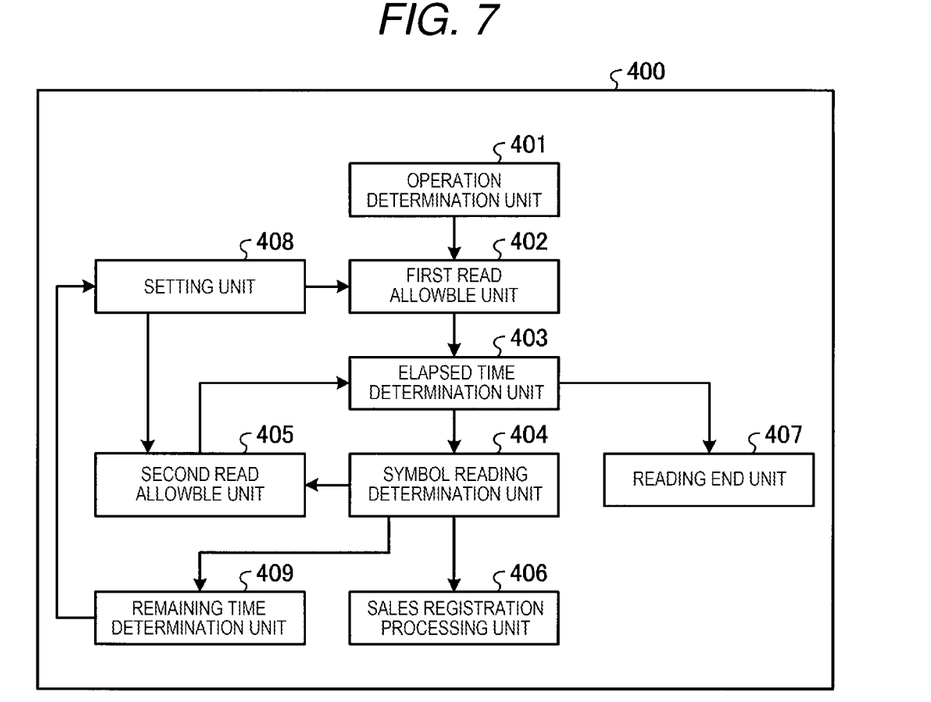
FIG. 7 is a schematic block diagram showing a functional configuration of a cart terminal according to a second embodiment.

A second embodiment will be described with reference to FIGS. 7 and 8. FIG. 7 is a schematic block diagram showing a functional configuration of a cart terminal 4 according to the second embodiment. In FIG. 7, the control unit 400 of the cart terminal 4 functions as an operation determination unit 401, a first read allowable unit 402, an elapsed time determination unit 403, a symbol reading determination unit 404, a second read allowable unit 405, a sales registration processing unit 406, a reading end unit 407, a setting unit 408, and a remaining time determination unit 409. The operation determination unit 401, the first read allowable unit 402, the elapsed time determination unit 403, the symbol reading determination unit 404, the second read allowable unit 405, the sales registration processing unit 406, and the reading end unit 407 have the same functions as those described in conjunction with FIG. 6, and the description thereof will be omitted.

When it is determined that the symbol reading determination unit 404 has read a code symbol, the remaining time determination unit 409 determines which of the remaining (unelapsed) portions of the first predetermined time and the second predetermined time is longer. When the remaining time determination unit 409 determines that the second predetermined time is longer than the remaining portion of the first predetermined time, the setting unit 408 sets the second predetermined time. When the remaining time is longer than the second predetermined time, the setting unit 408 sets the remaining time to the second predetermined time.

Figure 8:
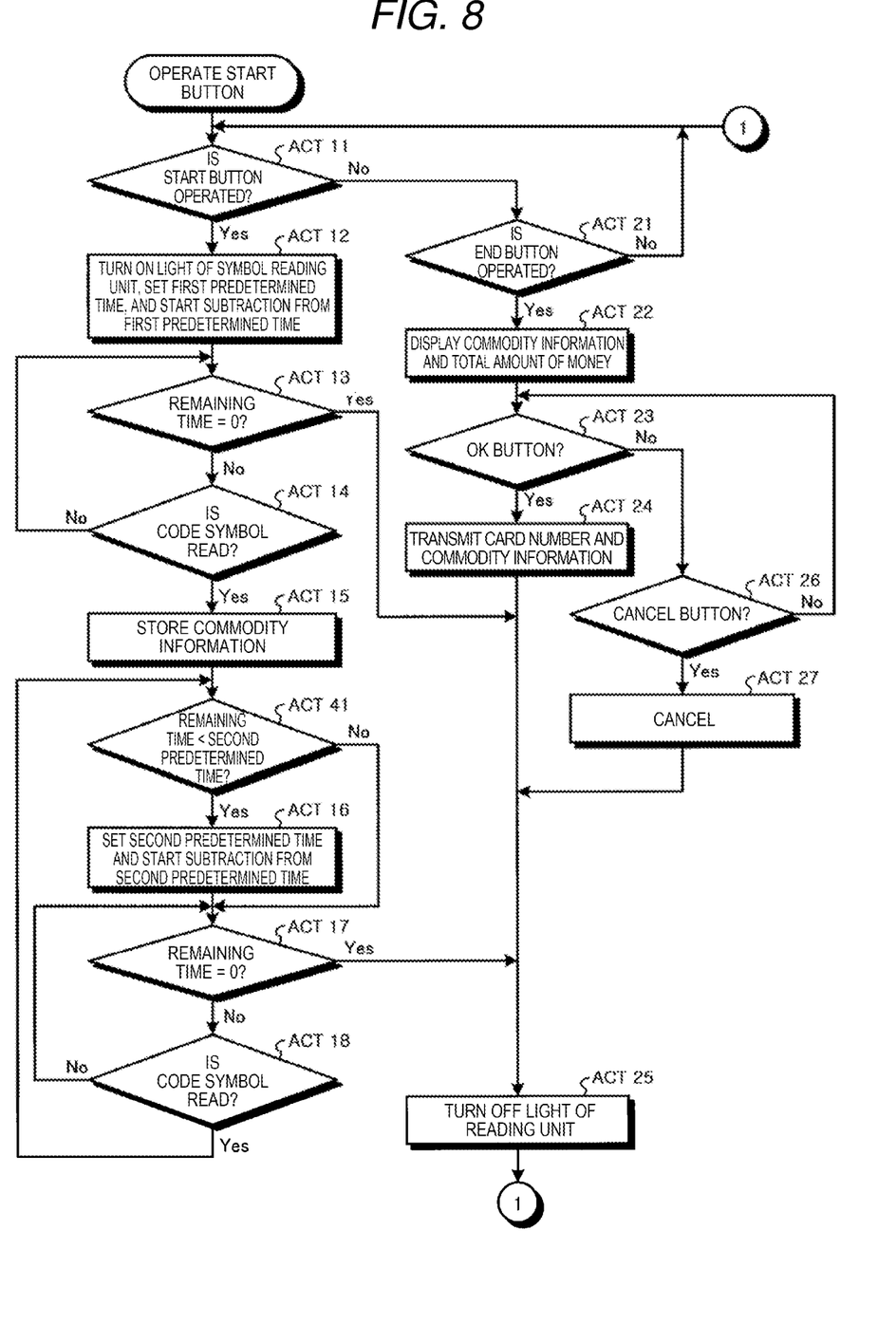
FIG. 8 is a flowchart depicting aspects a of control processing of a cart terminal.

Next, the control of the cart terminal 4 according to the second embodiment will be described. FIG. 8 is a flowchart showing the flow of control processing of the cart terminal 4 according to the second embodiment. In FIG. 8, since Act 11 to Act 27 are control processing substantially equivalent to those already described in conjunction with FIG. 6, description thereof will be omitted. In Act 15, the sales registration processing unit 406 executes sales registration processing of a commodity based on the obtained commodity code. Next, the remaining time determination unit 409 determines whether a second elapsed time is longer than the remaining time excluding the time elapsed from a first elapsed time set in Act 12 to when a code symbol is read in Act 14 as determined by the elapsed time determination unit 403 (Act 41). When the remaining time determination unit 409 determines that the second elapsed time is longer than the remaining time (Yes in Act 41), the control unit 400 executes the processing in and after Act 16.

In addition, when the remaining time determination unit 409 determines that the remaining time is equal to or longer than the second elapsed time (No in Act 41), the control unit 400 executes the processing in and after Act 17 without executing the processing in Act 16. For example, when the first predetermined time is 20 seconds, the second predetermined time is 5 seconds, and the remaining time is 4 seconds, the setting unit 408 sets the second predetermined time. In addition, when the remaining time is 10 seconds, the setting unit 408 does not set the second predetermined time, and the setting unit 408 sets the remaining time as the second predetermined time. The first read allowable unit 402 continues time countdown from the remaining time of the first predetermined time. Then, the control unit 400 executes the processing in and after Act 17.

According to the cart terminal 4 of the second embodiment, when the start button 481 is operated, the symbol reading unit 49 may read a code symbol for the first predetermined time. Then, it is possible to read a code symbol by the symbol reading unit 49 for a second predetermined time after a previous reading of a code symbol. Then, when a code symbol is read within the first predetermined time or the second predetermined time, sales registration processing of the commodity identified by the code symbol is executed. Therefore, the symbols of a plurality of commodities may be read consecutively.

For example, in the example embodiments, the first predetermined time is longer than the second predetermined time. However, the present disclosure is not limited thereto, and the first predetermined time and the second predetermined time may be the same length of time. In addition, the second predetermined time may be longer than the first predetermined time in some examples.

In addition, in the example embodiments, a cart terminal 4 is described as an example of a symbol reading device. However, the symbol reading unit 49 itself may be considered a symbol reading device in some embodiments.

In addition, in the example embodiments, the cart terminal 4 is attached to the shopping cart 2. However, the present disclosure is not limited thereto, and for example, the cart terminal 4 may be attached to a hand-carried basket or the like into which a commodity can be put.

The program to be executed in the cart terminal 4 of an embodiment can be recorded and provided as a file in an installable format or executable format in a non-transitory computer-readable recording medium such as a CD-ROM, a flexible disk (FD), a CD-R, a digital versatile disk (DVD), and the like.

In addition, the program to be executed by the cart terminal 4 may be stored on a computer connected to a network such as the Internet and provided by being downloaded via the network to the cart terminal 4. In addition, the program to be executed by the cart terminal 4 may be provided or distributed via a network such as the Internet.

In addition, the program to be executed in the cart terminal 4 may be provided by being incorporated in a ROM or the like in advance.

While certain embodiments have been described, these embodiments have been presented by way of example only, and are not intended to limit the scope of the present disclosure. Indeed, the novel embodiments described herein may be embodied in a variety of other forms; furthermore, various omissions, substitutions, and changes in the form of the embodiments described herein may be made without departing from the spirit of the present disclosure. The accompanying claims and their equivalents are intended to cover such forms or modifications as would fall within the scope and spirit of the present disclosure.

What is claimed is:

1. A symbol reading device, comprising:
   a scanner configured to read a symbol attached to a commodity for identifying the commodity; and
   a control unit connected to the scanner and configured to:
   determine whether an operation button for starting a symbol reading operation of the scanner has been pressed;
   count down a first predetermined time after it has been determined the operation button has been pressed and calculate an elapsed time of the first predetermined time;
   allow the scanner to read a first symbol within the first predetermined time after it is determined that the operation button has been pressed;
   use the calculated elapsed time to calculate a remaining time of the first predetermined time upon the reading of the first symbol within the first predetermined time;
   if the scanner successfully reads the first symbol within the first predetermined time, allow the scanner to read a second symbol within the longer one of a second predetermined time or the calculated remaining time of the first predetermined time during the same reading operation;

execute registration processing for commodities based on any successful reading of the first symbol within the first predetermined time or the second symbol within the longer one of the second predetermined time or the calculated remaining time of the first predetermined time; and end the symbol reading operation of the scanner when either the scanner does not read the first symbol within the first predetermined time or the second symbol within the longer one of the second predetermined time or the calculated remaining time of the first predetermined time.

2. The symbol reading device according to claim 1, wherein the scanner is mounted on a shopping cart.

3. The symbol reading device according to claim 1, wherein the second predetermined time is shorter than the first predetermined time.

4. The symbol reading device according to claim 1, wherein
the scanner includes a light to illuminate symbols attached to commodities, and
the control unit is configured to end symbol reading operation by the scanner by instructing the turning off of the light.

5. The symbol reading device according to claim 1, further comprising:
a memory unit for storing code symbols read by the scanner; and
a wireless communication unit configured to connect to a point-of-sale terminal, wherein
the control unit is further configured to transmit stored code symbols from the memory unit to the point-of-sale terminal via the wireless communication unit after a determination that an operation button for ending a shopping transaction has been pressed.

6. The symbol reading device according to claim 1, the control unit comprises a central processing unit.

7. The symbol reading device according to claim 1, wherein the first symbol and second symbol correspond to commodity codes of different products for sale at a retail location.

8. The symbol reading device according to claim 1, wherein the first symbol is a two-dimensional code.

9. The symbol reading device according to claim 1, wherein the scanner is a barcode scanner.

10. A symbol reading device, comprising:
a scanner to read a symbol attached to an item for identifying the item; and
a controller connected to the scanner and configured to:
receive a reading start instruction from an operation panel;
upon receiving the reading start instruction, cause the scanner to turn on and begin a first reading attempt;
allow the scanner to continue the first reading attempt for a first reading setting time after receiving the reading start instruction;
calculate an elapsed time from the beginning of the first reading attempt until a reading of the first code symbol in the first reading attempt;
calculate a remaining time for the first reading setting time using the calculated elapsed time;
cause the scanner to immediately begin a second reading attempt without turning the scanner off after a reading of a first code symbol in the first reading attempt;
compare the calculated remaining time to a first predetermined time setting for a second reading setting time;
set the second reading setting time to the longer one of the first predetermined time setting and the calculated remaining time;
allow the scanner to continue the second reading attempt until the first of a reading of a second code symbol or an elapse of the second reading setting time;
execute sales registration processing according to any reading of the first code symbol in the first reading attempt or the second code symbol in the second reading attempt;
cause the scanner to turn off if no code symbol is read in the first reading attempt within the first reading setting time; and
cause the scanner to turn off if no code symbol is read in the second reading attempt within the second reading setting time.

11. The symbol reading device according to claim 10, wherein the first reading setting time is a first predetermined time and the second reading setting time is a second predetermined time shorter than the first predetermined time.

12. The symbol reading device according to claim 10, wherein the scanner is mounted to a shopping cart.

13. The symbol reading device according to claim 12, further comprising:
a memory unit for storing code symbols read by the scanner; and
a wireless communication unit configured to connect to a point-of-sale terminal, wherein
the controller is further configured to transmit stored code symbols from the memory unit to the point-of-sale terminal via the wireless communication unit after a determination that an operation button for ending a shopping transaction has been pressed.

14. The symbol reading device according to claim 12, wherein the scanner is a bar code scanner.

15. The symbol reading device according to claim 10, wherein the scanner is a bar code scanner.

16. The symbol reading device according to claim 10, further comprising:
a memory unit for storing code symbols read by the scanner; and
a wireless communication unit configured to connect to a point-of-sale terminal, wherein
the controller is further configured to transmit stored code symbols from the memory unit to the point-of-sale terminal via the wireless communication after a determination that an operation button for ending a shopping transaction has been pressed.

17. The symbol reading device according to claim 10, wherein turning off the scanner comprises turning off an illumination source in the scanner.

18. A method of operating a symbol reading device, the method comprising:
determining whether an operation button for starting a symbol reading operation by a scanner has been pressed;
counting down a first predetermined time and calculating an elapsed time of the first predetermined time;

controlling the scanner to permit the scanner to read a first symbol within the first predetermined time after it is determined that the operation button has been pressed;

using the calculated elapsed time to calculate a remaining time of the first predetermined time upon the reading of the first code symbol within the first predetermined time;

when the scanner successfully reads the first symbol within the first predetermined time, controlling the scanner to permit the scanner to read a second symbol within the longer one of a second predetermined time or the calculated remaining time of the first predetermined time during the same reading operation;

executing registration processing for items based on any successful reading of the first symbol within the first predetermined time or the second symbol within the longer one of the second predetermined time or the calculated remaining time of the first predetermined time; and ending the symbol reading operation of the scanner when either the scanner does not read the first symbol within the first predetermined time or the second symbol within the longer one of the second predetermined time or the calculated remaining time of the first predetermined time.

19. The method according to claim 18, wherein the second predetermined time is shorter than the first predetermined time, the scanner is mounted to a shopping cart, and registration processing includes storing a commodity code corresponding to the first symbol.

20. The method according to claim 18, wherein the first symbol is a two-dimensional code.

* * * * *